United States Patent
Murray et al.

(10) Patent No.: US 8,533,291 B1
(45) Date of Patent: Sep. 10, 2013

(54) METHOD AND SYSTEM FOR PROTECTING PUBLICLY VIEWABLE WEB CLIENT REFERENCE TO SERVER RESOURCES AND BUSINESS LOGIC

(75) Inventors: Gregory L. Murray, Santa Clara, CA (US); Craig R. McClanahan, Tualatin, OR (US); Edward J. Burns, Alamonte Springs, FL (US)

(73) Assignee: Oracle America, Inc., Redwood City, CA (US)

( * ) Notice: Subject to any disclaimer, the term of this patent is extended or adjusted under 35 U.S.C. 154(b) by 1086 days.

(21) Appl. No.: 11/704,084

(22) Filed: Feb. 7, 2007

(51) Int. Cl.
*G06F 15/16* (2006.01)

(52) U.S. Cl.
USPC .......................................... 709/218; 709/217

(58) Field of Classification Search
USPC .................................................. 709/218, 217
See application file for complete search history.

(56) References Cited

U.S. PATENT DOCUMENTS

| | | | | |
|---|---|---|---|---|
| 6,122,631 A * | 9/2000 | Berbec et al. ...................... | 707/9 |
| 6,249,879 B1 * | 6/2001 | Walker et al. ..................... | 714/11 |
| 6,314,425 B1 * | 11/2001 | Serbinis et al. ..................... | 1/1 |
| 6,360,254 B1 * | 3/2002 | Linden et al. .................. | 709/219 |
| 6,385,701 B1 * | 5/2002 | Krein et al. .................... | 711/141 |
| 6,505,300 B2 * | 1/2003 | Chan et al. ..................... | 713/164 |
| 6,718,328 B1 * | 4/2004 | Norris ........................... | 709/229 |
| 6,931,530 B2 * | 8/2005 | Pham et al. .................... | 713/165 |
| 6,978,291 B2 * | 12/2005 | Vardi et al. .................... | 709/202 |
| 7,043,524 B2 * | 5/2006 | Shah et al. ..................... | 709/203 |
| 7,398,463 B2 * | 7/2008 | Bernstein et al. .............. | 715/235 |
| 7,480,935 B2 * | 1/2009 | Bazot et al. ........................ | 726/9 |
| 7,613,786 B2 * | 11/2009 | Nakamura et al. ............ | 709/217 |
| 2002/0019941 A1 * | 2/2002 | Chan et al. ..................... | 713/185 |
| 2002/0161717 A1 * | 10/2002 | Kassan et al. ..................... | 705/59 |
| 2003/0028653 A1 * | 2/2003 | New et al. ...................... | 709/229 |
| 2004/0059939 A1 * | 3/2004 | de Jong .......................... | 713/200 |
| 2004/0064707 A1 * | 4/2004 | McCann et al. ............... | 713/185 |
| 2004/0122958 A1 * | 6/2004 | Wardrop ........................ | 709/229 |
| 2004/0123154 A1 * | 6/2004 | Lippman et al. .............. | 713/201 |
| 2005/0015490 A1 * | 1/2005 | Saare et al. .................... | 709/225 |
| 2006/0031853 A1 * | 2/2006 | Kuperstein .................... | 719/320 |
| 2006/0101128 A1 * | 5/2006 | Waterson ....................... | 709/212 |
| 2006/0195544 A1 * | 8/2006 | Chan et al. ..................... | 709/216 |
| 2007/0044144 A1 * | 2/2007 | Knouse et al. ...................... | 726/8 |
| 2007/0130229 A1 * | 6/2007 | Anglin et al. ................. | 707/204 |
| 2007/0143229 A1 * | 6/2007 | Delahaigue et al. ............ | 705/72 |
| 2007/0198656 A1 * | 8/2007 | Mazzaferri et al. ........... | 709/218 |
| 2007/0208823 A1 * | 9/2007 | Shannon et al. .............. | 709/217 |
| 2007/0289002 A1 * | 12/2007 | van der Horst et al. ........... | 726/9 |
| 2008/0072301 A1 * | 3/2008 | Chia et al. .......................... | 726/8 |
| 2008/0114831 A1 * | 5/2008 | Maddox ......................... | 709/203 |
| 2008/0162582 A1 * | 7/2008 | Brooks et al. ................. | 707/200 |
| 2008/0189424 A1 * | 8/2008 | Maddox ......................... | 709/227 |

* cited by examiner

*Primary Examiner* — Firmin Backer
*Assistant Examiner* — Jonathan Bui
(74) *Attorney, Agent, or Firm* — Martine Penilla Group, LLP

(57) ABSTRACT

A method and system for protecting publicly viewable web client reference to network accessible data includes receiving a request for a server side resource from a client. The request is triggered upon loading of a page having a component that needs to access server side resource, at the client. A token for the server side resource is generated at the server using a resource-mapper, the resource-mapper identifying the server side resource that is to service the request from the client. The generated token and contents for the component are returned to the client, the generated token identifying an arbitrary path identifier to the server side resource that is viewable to the client, the arbitrary path identifier being interpreted by the resource-mapper to enable rendering of the content for the component at the client, such that the arbitrary path identifier protects identification information associated with the server side resource.

15 Claims, 5 Drawing Sheets

| Token | Mapped resource |
|---|---|
| XYZ | URL for external service A |
| MOBJ1 | Managed Object 101 |
| MOBJ2 | Managed Object 102 |
| ABC | URL for external geocoding service B |

Figure 3

METHOD AND SYSTEM FOR PROTECTING PUBLICLY VIEWABLE WEB CLIENT REFERENCE TO SERVER RESOURCES AND BUSINESS LOGIC

BACKGROUND

1. Field of the Invention

The present invention relates generally to client-server computing systems, and more particularly to a method and system for protecting publicly viewable web client reference to server side resources.

2. Description of the Related Art

In web-based applications, an application passes reference to a server-side resource or application logic onto the client in response to the server-side resource request. These references, in the form of tokens, are used by the clients using JavaScript to make requests back to the application logic on the server for processing or updating. Some examples of such references are a method or a value binding expression in HTML markup generated by JavaServer Faces™ components rendered in an HTML page. In order to reference reusable server-side resources such as components, methods or value binding expressions, a client requesting the server-side resources will store references to the server-side resources on the client and use the stored references during subsequent requests for the server-side resources from the server. These references retained at the client, however, are transparent to the users as they are not embedded within a Java code but are provided as parameters when requesting these resources from the server. These server side resource references may reflect the underlying data model of the server side application and may expose these data models to clients and other users when making requests for server side resources. Using the data model of the server side portion of an application, one can directly access the application logic associated with the server side resources, which may create security threat to the server side resources.

In order to hide application specific resources from view of the public, requests in the form of cookies with incorporated session Ids and/or random generated URL to map a session of a user to a browser are used. This mechanism of accessing the server side resources using session ids and randomly generated URLs are, however, transparent to the developers and does not solve the technical problem associated with exposing the server side application data models to the public.

In view of the foregoing, there is a need for a method and system that will overcome the aforementioned problems by protecting publicly viewable client references to server side resources and business logic that can be implemented easily and efficiently across all server platforms.

SUMMARY

The present invention fills the need by providing a resource-mapper on a server to receive a request from a client for network accessible data (server side resources) to be rendered on the client. The resource-mapper identifies the server side resource that can be used to service the request and generates a token for the identified server side resource. The contents of the server side resource and the corresponding token are then forwarded to the client. The contents of the server side resource are rendered at the client along with the token or the token is hidden and stored at the client for referencing the server side resource in the future. It should be appreciated that the present invention can be implemented in numerous ways such as a system or methods.

In one embodiment, the present invention includes a method for protecting publicly viewable web client reference to network accessible data. In this method, a request for a server side resource is received from a client, the request being triggered upon loading of a page having a component that needs to access the server side resource. A token for the server side resource is generated at the server using a resource-mapper, the resource-mapper identifying the server side resource that is to service the request from the client. The generated token and contents for the component are returned to the client for rendering, the generated token identifying an arbitrary path identifier to the server side resource that is viewable to the client, the arbitrary path identifier being interpreted by the resource-mapper to enable rendering of the content for the component at the client, such that the arbitrary path identifier protects identification information associated with the server side resource.

In another embodiment, a method for protecting publicly viewable web client reference to network accessible data is disclosed. In this method, a request for a server side resource is received from a client. The request is triggered upon loading of a page having a component that needs to access server side resource, at the client. A token associated with the server side resource, already generated and maintained at the server, is identified by a resource-mapper. The generated token identifies an arbitrary path identifier to the server side resource that is viewable to the client, the arbitrary path identifier enabling the resource-mapper to render the content for the component at the client. The arbitrary path identifier protects identification information associated with the server side resource. The identified token and content associated with the server side resource are returned to the client for rendering.

In yet another embodiment, a system for protecting publicly viewable web client reference to a network accessible data is disclosed. The system includes a client that requests access to a server side resource and a resource-mapper resident on a server to service the request. The request from the client is triggered upon loading of a page on the client having a component that needs to access server side resource. The resource-mapper on the server is configured to identify the server side resource that is to service the request from the client and generate a token for the server side resource. The generated token identifies an arbitrary path identifier to the server side resource that is viewable to the client. The resource-mapper interprets the arbitrary path identifier so as to enable the resource-mapper to render the content for the component at the client. The resource-mapper maintains a mapping of the generated token to the corresponding server side resource. The arbitrary path identifier protects identification information associated with the server side resource at the client.

The present invention, thus, describes a system and methods for protecting publicly viewable web client reference to network accessible data. By providing tokens having arbitrary path identifiers, the true identity of the network accessible data are hidden from the users at the client, thereby protecting the server side resources from unauthorized users.

BRIEF DESCRIPTION OF THE DRAWINGS

The invention may best be understood by reference to the following description taken in conjunction with the accompanying drawings. These drawings should not be taken to limit the invention to the preferred embodiments, but are for explanation and understanding only.

FIG. 3 illustrates an example of a hash mapping structure used in storing the mapping of the generated tokens to the server-side resources, in one embodiment of the invention.

DETAILED DESCRIPTION

Several embodiments for protecting publicly viewable web client reference to a network accessible data are described. It should be appreciated that the present invention can be implemented in numerous ways such as a system or method. It will be apparent to those skilled in the art that the present invention may be practiced without some or all of the specific details set forth herein.

To facilitate understanding of the various embodiments, the general architecture and operation of a client-server computing system will be described first. The process of the disclosed embodiments will then be described with reference to the general architecture.

Figure 1:
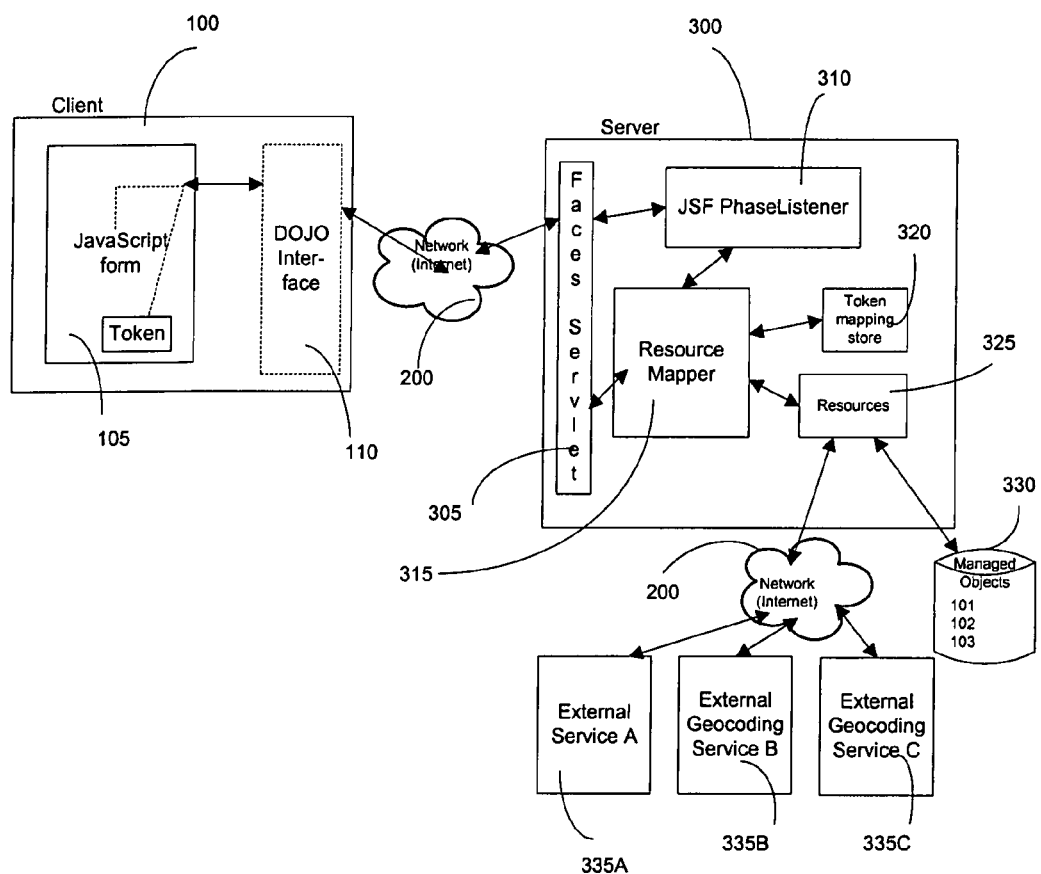
FIG. 1 illustrates an overview of a client-server computing system involved in protecting publicly viewable web client reference to a network accessible data, in one embodiment of the present invention.

FIG. 1 illustrates resources of a client-server computing system involved in protecting publicly viewable web client reference to a network accessible data, in one embodiment of the invention. According to this embodiment, a client computer (client) 100 is interconnected to a server computer (server) 300 over the Internet (or any type of network) 200. The client 100 runs client software to access the network and the server runs a server software to connect to the Internet 200. The client uses a graphic user interface (not shown) for displaying contents of a page rendered on the client 100. A page is generally used to depict an amount of data that is forwarded from a server. The data can be in any number of forms including a defined webpage. The webpage is generally defined using Hypertext Markup Language (HTML) statements and JavaScript that specify the webpage's data functionality and associated GUI elements.

The client 100 includes a client interface to interact with the server 300. The client interface could be an applet or any other customized interface that is capable of interacting with the server 300. A Servlet, in the form of an Faces Servlet 305 on the server 300 interacts with the client 100 through the network 200, and with other components residing on the server 300, such as a JavaServer Faces™ (JSF) component in the form of a JSF PhaseListener (JPL) 310. The JPL 310 may include a JSF Servlet 305 that receives and analyzes requests received through the Faces Servlet 305 from the client 100. In one embodiment, the JPL 310 may interface with a JSF Renderer (not shown) to create a token for a method binding expression within the JSF Renderer and to obtain application logic for the method binding expression, such as JavaScript code, to render on the client 100 in response to a request from the client 100.

Continuing to refer to FIG. 1, the JPL 310 interacts with a resource-mapper 315 on the server 300 to obtain contents of a server-side resource. The resource-mapper 315 allocates and controls the resources available to the server 300 to service the request from the client 100. The resource-mapper 315, in turn, interacts with a resource component (resources) 325 to identify a server-side resource that can service the client's request and generates a unique random token for the identified server-side resource. The random token may be generated using any random generator logic available to the resource-mapper 315. The random token generated may include alpha-numeric characters and the length of the generated random token may be varied according to a level of security desired for the server-side resource. The generated random token is mapped to the identified server side resource and maintained in a token mapping store 320 on the server 300. The token mapping store 320 may reside within the resource-mapper 315 or can be accessed by the resource-mapper 315. The generated random token from the resource-mapper associated with the server-side resource is forwarded to the JPL 310 along with the contents of the server-side resource. The server side resource may include managed objects 330 residing within the server 300 or external services such as external service A, external geocoding services B and C (335A, 335B and 335C, respectively) that can be accessed by the resource-mapper through the Internet 200.

In one embodiment, the server 300 is a proxy server and the resource-mapper 315 along with the associated JPL 310 reside on this proxy server. A proxy server is a "middle-man" between the client and the network of servers and acts on behalf of the network of servers by providing screening, firewall, caching, or a combination of these functions. The proxy server hides the true identity of the servers so monitoring is difficult for external users, thereby protecting the services and resources of the servers. Although firewalls within a server prevent access to server side resources, the use of proxy server provides an additional layer of security.

An optional server communication framework interface, such as Dojo framework, may be used by the client 100 to manage communication with the server 200. The server communication framework is a platform independent communication mechanism that may be used on the client 100 or on the server 200 to abstract any browser differences that may exist during the communication between the client 100 and the server 200. In one embodiment illustrated in FIG. 1, the server communication framework, in the form of Dojo framework 110, is used on the client 100. Other server communication framework may be used so long as the framework is able to abstract any browser differences that may exist during the communication between the client controller 110 and the server 200.

Thus, by generating a random token for a server-side resource using a resource-mapper 315 and passing this token back and forth between the client 100 and the server 300 every time a re-usable server-side resource is referenced, the true identity of the server-side resource is hidden from public view. The token represents an arbitrary path identifier that can be interpreted by the resource-mapper 315 to obtain the contents of a component at the client. By using an arbitrary path identifier, the true identification information associated with the server-side resource is hidden from the users so that unauthorized users will not be able to access the server-side resources and the underlying data models. To further enhance security of the reference to server-side resources, the random token may be generated specific to a process or a session.

It is noteworthy that the embodiments are not limited to the architecture of FIG. 1. For example, hand-held computers, notebook or laptop computers, set-top boxes or any other computing system (wired or wireless) capable of connecting to the Internet and running computer-executable process operations, as described below, may be used to implement the various aspects of the present invention. Additionally, the software program, in general, should be viewed as pieces of code, and such code can be written in other languages so long as its functionality enables the process operations of the present invention.

Figure 2:
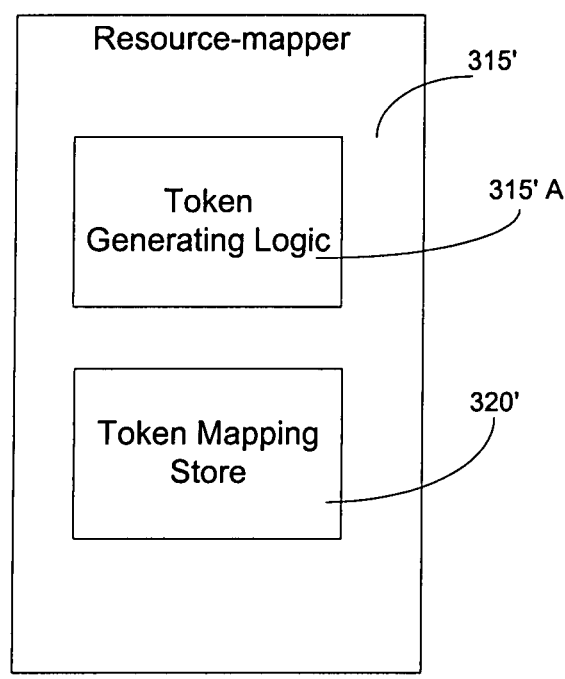
FIG. 2 illustrates an overview of the components of a resource-mapper, in one embodiment of the invention.

An embodiment of a resource-mapper is illustrated in FIG. 2. According to this embodiment, the resource-mapper 315' includes a token generating logic 315'A and a token mapping store 320'. The token generating logic 315'A is used to identify a server-side resource needed to service a request from a client 100 and to generate a unique random token for the server-side resource. In one embodiment, the token generating logic 315'A uses a random value generator to generate a random alpha-numeric token that represents an arbitrary path identifier for the identified server-side resource. Although a random value generator was used to generate a random token, other forms of generating a token may be employed so long as the functionality of the token is maintained. The generated token may be associated with a process, session or to the server-side resource. The token mapping store 320' within the resource-mapper 315' maps the generated random token to the associated server-side resource and stores the mapping in the token mapping store 320'.

In the case where the token is associated with a process or session, the mapping of the token to the server-side resource is stored in the appropriate process or session scope within the token mapping store 320', for later retrieval. In one embodiment, the mapping uses a name-value hash table where the name relates to the generated random token and the value represents the associated server side resource. As mentioned earlier, the server-side resource may be a managed object or an external service accessible by the resource-mapper 315'. In the embodiment illustrated in FIG. 2, the token mapping store 320' is within the resource-mapper 315'. The token mapping store 320' may be outside the resource-mapper as illustrated in FIG. 1.

FIG. 3 illustrates an example of a hash mapping structure used in storing the mapping of the generated tokens to the server-side resources, in one embodiment of the invention. In this embodiment, the hash mapping structure uses a name-value pair to store the mapping. The name refers to the random token generated by the resource-mapper 315 and the value represents the mapped resource to which the random token is mapped. As can be seen from the table represented in FIG. 3, the server-side resource includes both managed objects and external services. Although a hash mapping structure is used in representing the mapping of the generated random tokens to the associated server-side resources, other forms of representing mapping may be used.

Figure 4:
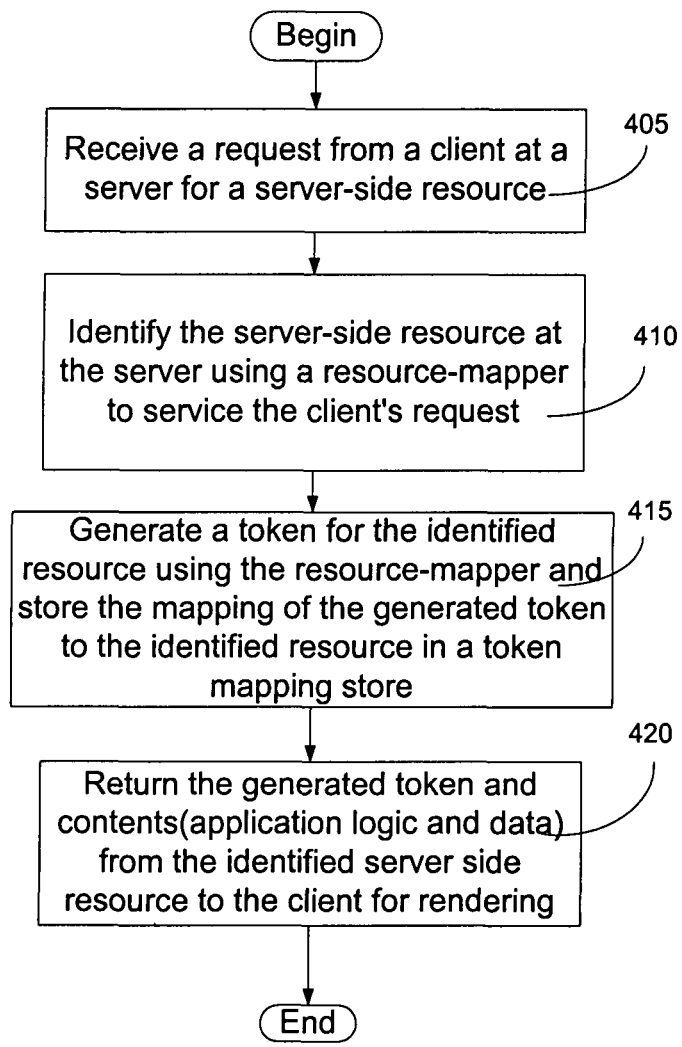
FIG. 4 illustrates a flowchart of operations involved in generating a token used in protecting publicly viewable web client reference to a network accessible data, in one embodiment of the invention.

The operational details of the disclosed embodiments will now be described with reference to the general architecture described in FIG. 1. FIG. 4 illustrates the operational steps involved in carrying out the present invention. An application executing on a client 100 renders a webpage on the client 100. The webpage rendered on the client may include different types of data in JavaScript, HTML, XHTML, etc. The webpage may include a component that needs to access a server-side resource on a server 300. A request to the server-side resource is initiated at the webpage upon rendering of the webpage on the client 100. The request triggers an event related to the request on the client 100. The event may include a plurality of request parameters that identify the event, the server to which the event is mapped to and the server-side resource at the server referenced in the request by the client 100. The event is forwarded by the client 100 through the client interface running at the client 100 and the network 200 to the server 300, to which the client 100 is mapped. In one embodiment where the DOJO Interface is present on the client 100, the request is forwarded through the DOJO interface over the network 200 to the server 300.

The server 300 receives the request from the client 100 at the Faces Servlet (Servlet) 305, as shown in operation 405 of FIG. 4. The Servlet 305 analyzes the request and forwards the request to a JavaServer Faces (JSF) component on the server 300. The JSF component in the form of JSF PhaseListener (JPL) 310 receives the request from the Servlet 305. A JSF Servlet within the JPL 310 may receive the request from the Servlet 305 and analyze the request. The JPL 310 then interacts with a resource-mapper 315 on the server 300 to obtain the data and logic of the server-side resource to service the request from the client 100. In one embodiment, the request may be associated with a method binding expression resident in a JSF Renderer (not shown) on the server 300. In this embodiment, the method binding expression resident in a JSF Renderer is a managed object.

In another embodiment, the request may be associated with an external service that is accessible by the server 300 or may be associated with other managed objects on the server 300. Resource-mapper 315 allocates and controls the resources available to the server 300 to service the request from the client 100. Upon receipt of the request from the JPL 310, the resource-mapper 315 first verifies to see if the request for server-side resource is a new request. If the request is a new request, the resource-mapper 315 interacts with a resource component 325 to identify the server-side resource to service the request from the client 100, as shown in operation 410. The resource component 325 may be mapped to the JSF Renderer, other components or with the external servers. Once the server-side resource is identified, the resource-mapper 315 generates a random token to represent the identified server-side resource, as shown in operation 415. The identified server-side resource may include a method binding expression in the JSF Renderer. The random token maybe generated as an alpha-numeric token using a random value generator and could be scoped to a specific process or session or to the server-side resource. Depending on the level of security needed by a specific application using the token, the size of the random token may be varied.

Once the resource-mapper 315 generates the token for the identified server-side resource, the resource-mapper 315 maps the generated token to the associated server-side resource and maintains the mapping in the proper scope within a token mapping store 320, as illustrated in operation 415. By maintaining a mapping of the token in the token mapping store 320, the resource-mapper will ensure that references to the same server-side resource within a proper scope, such as an application or session or process, will result in the same server-side resource being returned to the client 100. Thus, a re-usable server-side resource can be referenced using the same token within the scope of the generated token.

The resource-mapper returns the identified server-side resource and the associated token to the JPL 310 in response to the request. The JPL 310 will bundle the token and the contents of type HTML, XML, JavaScript, JavaScript Object Notation (JSON) or plain text into a HTTP response and return the response to the client 100 through the Servlet 305, as shown in operation 420. A JSF Renderer (not shown) may also forward code associated with other portions of the HTML page through the Servlet 305 to the client 100 for rendering at this time. The method concludes when the content from the server-side resource is rendered on the page at the client 100. In one embodiment, the token is rendered in the resulting HTML on the page and is used for referencing the server-side resource associated with the token. In this embodiment, when the server-side resource is referenced, the token is used as a Uniform Resource Locator (URL), which is mapped to the JPL 310 on the server 300. Upon receipt of the subsequent requests from the client 100, the JPL 310 will parse out the token and find the resource mapping based on the token using the resource-mapper 315 and use this mapping to access the application logic (contents) mapped to the token from the token mapping store 320.

In another embodiment, the token is rendered as a hidden form parameter. A hidden form parameter is an HTML element, contained within an HTML form element, that stores a name-value pair in the browser without displaying it to the user. A name-value pair stored in this manner will be submitted to the server along with all the other name-value pairs (both hidden and non-hidden) when the form is submitted. In this embodiment, an event associated with the token will trigger the token. The token is used as an URL and is mapped to the JPL 310. As mentioned above, the JPL 310 will parse the token and find the mapping to the server-side resource using the resource-mapper 315. The application logic of the server-side resource is returned to the client 100 for rendering.

Figure 5:
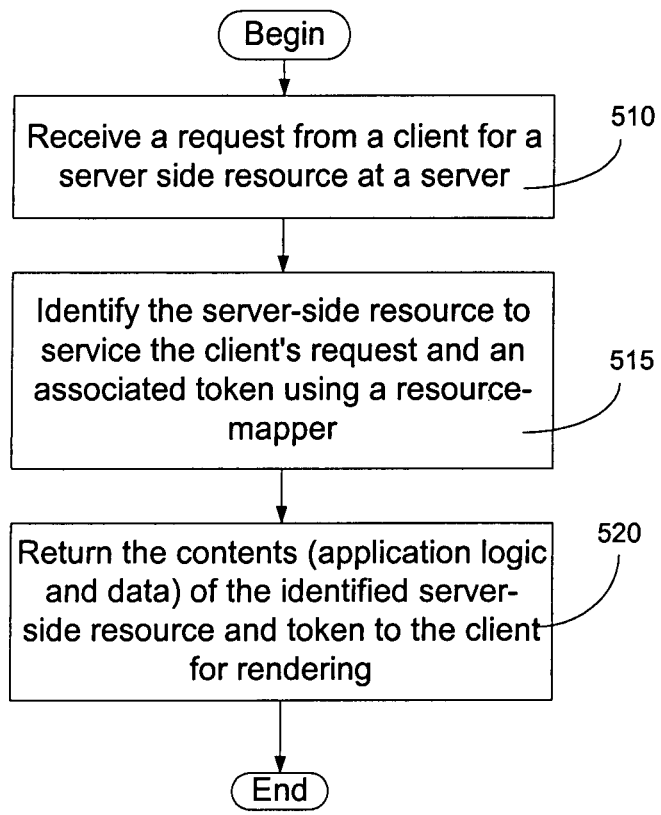
FIG. 5 illustrates a flow chart of operations involved in identifying and transmitting an already generated token, in one embodiment of the invention.

FIG. 5 illustrates the process operations involved in identifying and transmitting an already generated token, in one embodiment of the invention. In this embodiment, the random token has already been generated for the server-side resource and maintained on the server 300. The token generated may have a session scope or an application scope. The process begins when a client 100 requests for a server-side resource from a server 300, as shown in operation 510. The request from the client 100 is triggered upon loading of a page on the client 100 having a component that needs to access server-side resource. The request is received at the server 300 through the network 200 and Faces Servlet 305. The Servlet 305 analyzes the request and forwards it to a JavaServer Faces (JSF) component in the form of a JSF PhaseListener (JPL) 310. In one embodiment, the JPL 310 may interface with a JSF Renderer (not shown) to create a token for a method binding expression within the JSF Renderer and to obtain application logic for the method binding expression, such as JavaScript code, to render on the client 100 in response to a request from the client 100.

If the request includes a generated token rendered on the client 100 and used in the form of an URL mapped to the JPL 310, the JPL 310 will parse out the token and find a corresponding resource mapping based on the token using a resource-mapper 315 and use this mapping to access application logic (contents) mapped to the token from the token mapping store 320. This may be the case where the token has a session scope and the request for the resource is within the given session.

If the request is for a server-side resource with an application scope, the request may be from a different user. In such a case, the request is forwarded to the server 300 through the network 200. The server 300 receives the request from the client 100 through an Faces Servlet (Servlet) 305, as shown in operation 510. The Servlet 305 forwards the request to a JavaServer Faces (JSF) component in the form of a JSF PhaseListener (JPL) 310 on the server 300. The JPL 310 interacts with a resource-mapper 315 resident on the server 300 to identify the server-side resource that is used to service the request from the client 100, as shown in operation 515. The resource-mapper 315 allocates and controls the resources available to the server 300 to service the request from the client 100. The resource-mapper 315 interacts with a resource component 325, to identify the server-side resource, and a token mapping store 320 using the identified server-side resource, to obtain the generated token associated with the identified server-side resource. The application logic and data associated with the server-side resource together with the generated token are returned to the JPL 310 in response to the request. The JPL 310 will then bundle the contents of the response of type HTML, XML, JavaScript, JSON or plain text as a HTTP response and forward this response through the Servlet 305 to the client 100 for rendering, as shown in operation 520. The method concludes when the data and application logic associated with the server-side resource is rendered at the client 100. The generated token may be rendered alongside the form contents of the page with the HTML or may be rendered as a hidden form parameter.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for protecting a publicly viewable web client reference to network accessible data, comprising:

receiving a request from a client at a server for a server-side resource, the request being triggered without user input upon loading of a page having a component that needs to access the server-side resource;

generating a token for referencing the server-side resource at the client using a resource-mapper, the token representing an arbitrary path identifier specific to a process or a session related to the request, wherein the arbitrary path identifier is interpreted by the resource mapper to obtain information related to the server-side resource, the resource-mapper identifying the server-side resource that is to service the request from the client, wherein the token is generated at the server as a random value of alpha-numeric characters and represents a name in a name-value pair, the value of the name-value pair is mapped to the server-side resource, wherein a length of the generated token varies based on a level of security set for the server-side resource; and returning the generated token to the client, wherein the generated token is used as a Uniform Resource Locator (URL) to map to the server and the corresponding server-side resource by the resource-mapper, the random value of alpha-numeric characters being viewable at the client as the URL and interpreted by the resource-mapper to enable rendering of the content for the component at the client, such that the random value of alpha-numeric characters protect identification information of the server-side resource.

2. The method for protecting publicly viewable web client reference to network accessible data of claim 1, wherein the resource-mapper further including:

maintaining a mapping of the server-side resource associated with the generated token, the mapping of the server-side resource accessible to the resource-mapper.

3. The method for protecting publicly viewable web client reference to network accessible data of claim 2, wherein the mapping of the server-side resource to the token is maintained as a hash table.

4. The method for protecting publicly viewable web client reference to network accessible data of claim 1, wherein the resource-mapper manages the server-side resources and the generated token at the server.

5. The method for protecting publicly viewable web client reference to network accessible data of claim 1, wherein the token is generated using a random value generator and includes alpha numeric characters.

6. The method for protecting publicly viewable web client reference to network accessible data of claim 1, wherein the server-side resource is any one of a managed object or an external service accessible by the resource-mapper.

7. The method for protecting publicly viewable web client reference to network accessible data of claim 1, wherein the token is specific to an application.

8. A method for protecting a publicly viewable web client reference to network accessible data, comprising:

receiving a request from a client at a server for a server-side resource, the request being triggered without user input upon loading of a page at the client, the page having a component that needs to access server-side resource, the request including a token with random value of alpha-numeric characters;

parsing the token to identify the corresponding server-side resource using a resource-mapper, wherein the token is used as a Uniform Resource Locator (URL) to map to a server and the corresponding server-side resource by the resource-mapper, the token having been generated by the resource-mapper at the server for referencing the server-side resource at the client, the token representing an arbitrary path identifier specific to a process or a session related to the request, wherein the arbitrary path identifier includes a name of a name-value pair, the value of the name-value pair is mapped to the server-side resource, wherein a length of the token varies based on a level of security set for the server-side resource, the random value of alpha-numeric characters of the arbitrary path identifier being viewable at the client as the URL and interpreted by the resource-mapper to identify content for the component at the client, the random value of alpha-numeric characters protecting identification information of the server-side resource; and returning identified content for the component to the client for rendering.

9. The method for protecting publicly viewable web client reference to network accessible data of claim 8, wherein the token is generated by the resource-mapper and maintained in a table accessible by the resource-mapper, the resource-mapper identifying the server-side resource that is to service the request from the client.

10. The method for protecting publicly viewable web client reference to network accessible data of claim 9, wherein the token is generated using a random value generator and includes alpha numeric characters.

11. The method for protecting publicly viewable web client reference to network accessible data of claim 8, wherein the token is specific to an application or a server-side resource.

12. A system for protecting a publicly viewable web client reference to a network accessible data, comprising:

a client, the client requesting access to a server-side resource, the request triggered without user input upon loading of a page having a component that needs to access the server-side resource; and a resource-mapper resident on a server, the resource-mapper configured to;

identify the server-side resource that is to service the request from the client;

generate a token for referencing the server-side resource at the client, the generated token is a random value of alpha-numeric characters representing a name in a name-value pair and represents an arbitrary path identifier specific to a process or a session related to the request, the value of the name-value pair is mapped to the server and the server-side resource, wherein a length of the generated token varies based on a level of security set for the server-side resource, the resource mapper interprets the arbitrary path identifier to obtain information related to the server-side resource; and maintain a mapping of the generated token of random value to the corresponding server-side resource as a name-value pair;

return the generated token to the client in response to the request, wherein the generated token is used as a Uniform Resource Locator (URL) to map to the server and the server-side resource, the random value of alpha-numeric characters being viewable at the client as the URL and interpreted by the resource mapper to enable return of the content for the component to the client for rendering, wherein the arbitrary path identifier protects identification information associated with the server-side resource at the client.

13. The system for protecting publicly viewable web client reference to a network accessible data of claim 12, wherein the server-side resource is anyone of a managed object or an external service accessible by the resource-mapper on the server.

14. The system for protecting publicly viewable web client reference to a network accessible data of claim 12, wherein the mapping is maintained as a hash table accessible to the resource-mapper.

15. The system for protecting publicly viewable web client reference to a network accessible data of claim 12, wherein the generated token is specific to an application running on the client.

* * * * *